Oct. 16, 1951  T. W. HOSKING  2,571,364
SPRING STUD FASTENER
Filed Jan. 16, 1948  2 Sheets-Sheet 1
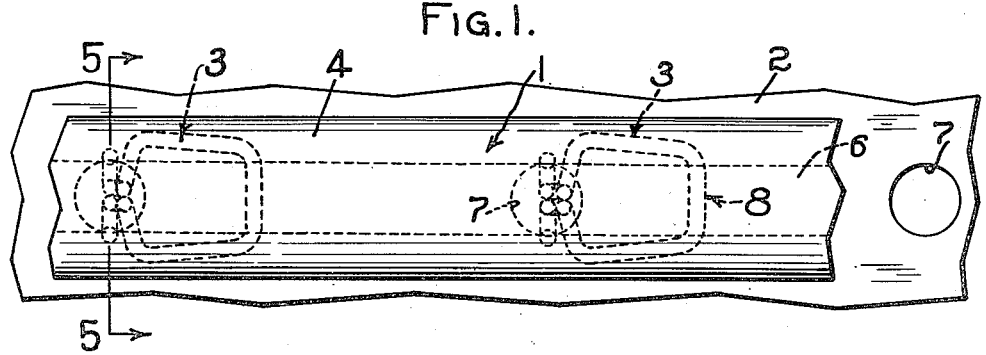
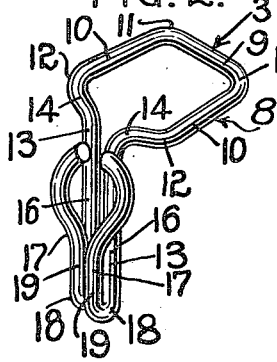
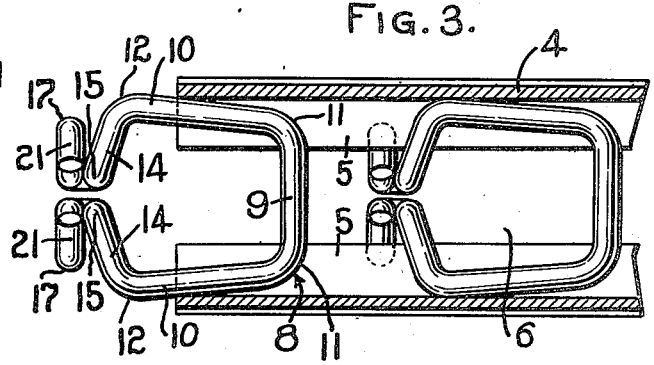
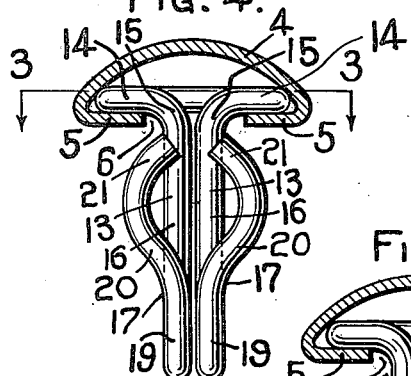
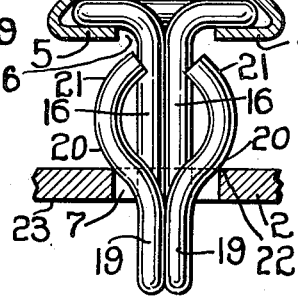
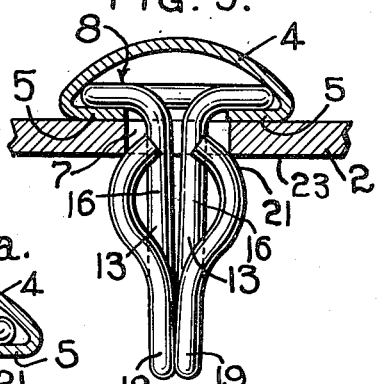
INVENTOR.
THOMAS W. HOSKING,
BY John Todd
ATT'Y.

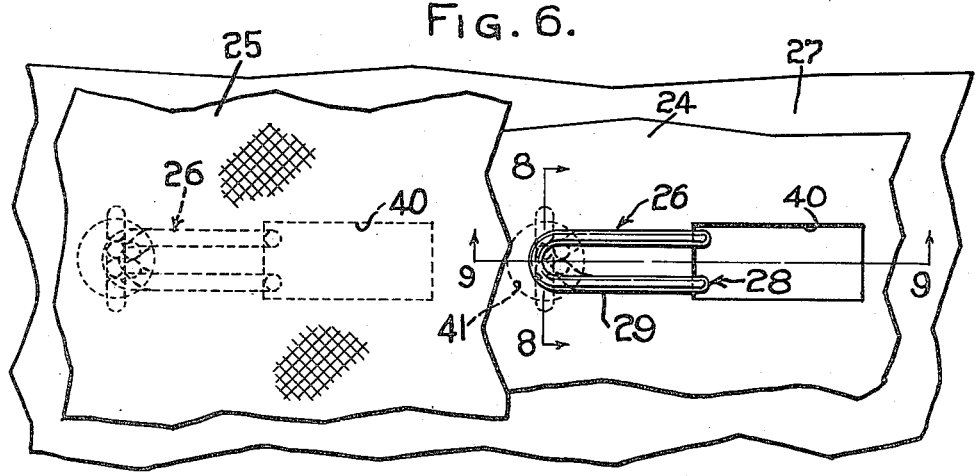
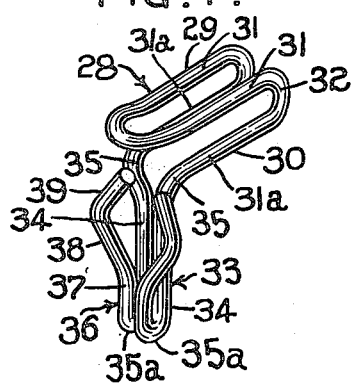
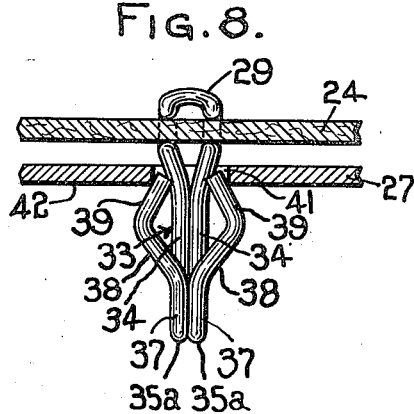
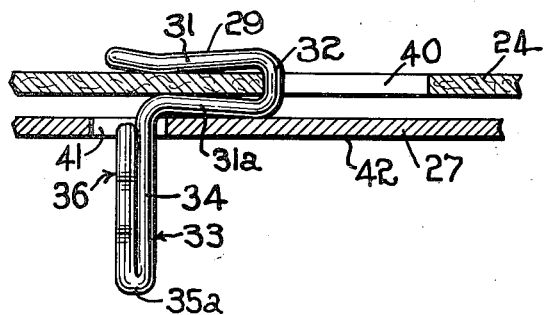

Patented Oct. 16, 1951

2,571,364

UNITED STATES PATENT OFFICE 2,571,364

SPRING STUD FASTENER

Thomas W. Hosking, Detroit, Mich., assignor to United-Carr Fastener Corporation, Cambridge, Mass., a corporation of Massachusetts Application January 16, 1948, Serial No. 2,702

2 Claims. (Cl. 24—73)

This invention relates to improvements in fastener members for securing an apertured part such as a hollow molding or upholstery panel to a support.

The chief object of my invention is the provision of a fastener member of simple construction formed in a way to effect a secure fastener engagement with the parts to be secured together. In the preferred embodiment of my invention my improved fastener is formed from one piece of spring wire. While wire fasteners have heretofore been used for carrying out the objects to which my present fastener is directed, applicant has provided by his construction an improved fastener action designed to effect a more secure fastened assembly.

In the drawings:

Fig. 1 is a front elevation of a moulding strip secured to a supporting structure with my preferred form of improved fastener members shown in dotted lines;

Fig. 2 is a perspective view of my improved form of fastener member;

Fig. 3 is a front elevation of a portion of a molded strip with the front of the strip broken away to show the method by which my preferred fasteners are secured to the strip;

Fig. 4 is a cross-sectional view of a piece of moulding showing my preferred fastener assembled therewith;

Fig. 4a is a sectional view similar to Fig. 4 showing the action of my preferred fastener during attachment thereof to a supporting structure;

Fig. 5 is a section taken along the line 5—5 of Fig. 1;

Fig. 6 is a front elevation showing an upholstery panel secured to a supporting member by means of a second form of my fastener member;

Fig. 7 is a perspective view of my second form of fastener member per se;

Fig. 8 is a section taken along the line 8—8 of Fig. 6; and

Fig. 9 is a section taken along the line 9—9 of Fig. 6.

The particular installation which I have chosen for the purpose of illustrating the use of my preferred form of fastener includes a hollow sheet metal strip 1 secured to a supporting structure 2 by means of the fastener members 3. The molding strip 1 is of the type commonly used for ornamenting the exteriors of automobile bodies and the like and provides a front portion 4 of curved cross-sectional shape and flanges 5 extending inwardly toward each other from the lateral marginal edges of the front portion 4. The inner edges of the flange portions 5 are spaced one from another to provide an opening 6 running lengthwise of the strip. The supporting structure 2 may be a sheet of flat metal having apertures 7 to receive stud portions of the fastener members 3 as will be hereinafter described.

Referring to my preferred form of fastener member most clearly illustrated in Figs. 2 to 5, I have shown one of simple construction formed from a single piece of spring wire. My preferred form of fastener has a base 8 comprising an end portion 9 and side portions 10—10 integrally joined to opposite ends 11—11 of the end portion 9 and extending outwardly therefrom in the same plane so as to be disposed in space relation one to another. The side portions 10 diverge slightly from their points of junction 11—11 with the end portion 9 to their outermost ends 12—12, as most clearly shown in Fig. 3, to effect a frictional attachment to the molding strip 1 as will be hereinafter described. A projecting portion comprising a pair of projections 13—13 integrally joined to the outer ends 12—12 of the side portions 10—10 extends outwardly from the base 8 in angular relation to the plane of the base. While I have illustrated my preferred form of fastener as having the projections 13—13 disposed in substantially perpendicular relation to the plane of the base it will be understood that this angle may be modified without departing from the scope of the invention. The projections 13—13 include connecting elements 14—14 which extend from their points of junction with the end portions 12—12 of the side portions 10—10 inwardly toward each other to terminate in closely dispossed portions 15—15 as shown in Figs. 3 and 4. The projections have straight elements 16—16 which extend from the ends 15—15 of the connecting elements outwardly from the plane of the base 8. The straight elements 16—16 are preferably disposed in side by side relation and normally are spaced apart slightly along their entire lengths for a purpose to be described.

A stud portion in integrally attached to the outer ends of the projections 13—13 and extends toward the plane of the base 8 in a direction reverse to that taken by the projecting portions 13—13. The stud portion comprises two holding elements 17—17 integrally joined to the outer ends 18—18 of the straight elements 16—16 as most clearly shown in Fig. 2. The holding elements 17—17, which are arranged for movement toward and away from each other in the same plane, are preferably disposed on an opposite side of the projecting portions 13—13 from the base 8, but it will be understood that they would be capable of efficient operation if they were disposed on the same side of the projecting portions 13—13 as the base. The holding elements have straight portions 19—19 connecting the respective elements with the ends 18—18 of the projecting portions 13—13, diverging cam elements 20—20 and converging holding elements 21—21. The straight portions 19—19 are disposed in close abuttable side by side relation for a purpose to be described. The holding elements 17—17, in the preferred form of my invention, lie in a plane substantially adjacent the projecting portions 13—13 and parallel therewith.

In assembling the parts of my installation, the fastener members are first secured in engagement with the strip 1. This is accomplished, as most clearly shown in Fig. 3, by moving the base 8 into the hollow strip 1 endwise of the strip. As a result of the diverging construction of the side portions 10 of the base 8, the side portions, which are spaced apart adjacent their ends 12—12 a distance greater than the width of the strip 1, are compressed during the entering action. The fasteners are maintained in desired position along the length of the strip by frictional engagement exerted by the side portions 10—10 in their effort to return to normal expanded position upon the inner surface of the front portion 4 of the strip 1.

In securing the hollow strip 1 to the support 2, the straight portions 19—19 of the stud portion are moved through the aperture 1 to engage the cam elements 20—20 of the stud portion with the wall portion 22 adjacent the aperture 7 of the support 2 (Fig. 4a). As pressure upon the strip 1 to force the stud portion through the aperture 7 is continued, the holding elements are compressed to enable the stud portion to project through the aperture and engage the holding portions 21—21 behind the lower surface 23 of the support 2 (Fig. 5). During the action by which the holding elements 17—17 are compressed in passage thereof through the aperture 7, the straight portions 19—19 of the stud portion together with the straight portions 16—16 of the projections 13—13 are caused to abut, as shown in Fig. 4a, thereby effecting a stiffening action. This stiffening action results in increased resilience in the holding elements 17—17 due to the fact that in order for the cam portions 20—20 and holding portions 21—21 to pass through the aperture, it is necessary that these last mentioned portions flex independently of the projecting portions 13—13 which move toward and away from each other under the tension set up by the base 8. It will be noticed from inspection of Fig. 5 that when the fastener is in final fastened engagement with the support 2, the straight portions 19—19 of the stud portion may still be in abutting stiffened relation while the projecting portions 13—13 may separate slightly in their effort to assume normal slightly spaced relationship one to another.

One form of installation with which my second form of fastener may be used is illustrated in Fig. 6 and comprises an upholstery panel 24, which carries a piece of upholstery 25 on its interior side, secured by means of my second form of fastener 26 to a supporting panel 27. My second form of fastener member is preferably formed from a single piece of spring wire which is bent intermediate its free ends in a way to provide a base 28 comprising a pair of spaced arm portions 29 and 30. The upper arm portion 29 has two substantially straight portions 31—31 disposed in spaced substantially side by side relation. The lower arm 30 is similarly formed providing straight portions 31a—31a in spaced relation. Each of the straight portions 31 of the upper arm 29 is joined at one of its ends to a respective straight portion 31a of the lower arm 30 by a bight portion 32. A projecting portion 33 extends outwardly from the lower arm 30 in substantially perpendicular relation to the plane of the base 28. The projecting portion 33 comprises two relatively straight portions 34 which are joined to the ends 35 (Fig. 7) of the straight portions 30 away from the bight portions 32 and normally extend in side by side abutting relation. A stud portion 36, which may be identical in form to the stud portion of my preferred form of fastener member, is integrally joined to the outer ends 35a of the straight portions 34 and extends toward the plane of the base 28 in a reverse direction to that taken by the projecting portion 33. The stud portion 36 provides holding elements similar in construction to those of my first form having abutting straight connecting portions 37, diverging guide portions 38 and converging holding portions 39.

In assembling the parts of the installation illustrated in Fig. 6, the upper arm 29 of the fastener member is inserted through the aperture 40 of the panel 24 by direct axial movement and thereafter the fastener is moved laterally so as to engage the arms 29 and 30 with opposed sides of the panel. The distance between the arms 29 and 30 may be normally less than the thickness of the panel 24 with the result that the arms frictionally engage opposed surfaces of the panel when the fastener is assembled therewith. In securing the panel 24 to the supporting structure the stud portion 36 is moved through an opening 41 of the supporting panel to engage the holding portions 39 of the stud portion behind the surface 42 of the support as shown in Fig. 8. As a result of the construction of my second form of fastener member wherein the straight portions 34 of the projecting portions 33 are normally in abutting relation, the fastener is stiffened to such an extent that the entire resilience of the stud portion is gained through flexure of the diverging and converging portions of the holding elements which pivot adjacent their points of junction with abutting straight portions 37.

Thus by my invention, I have provided a fastener member of simple construction capable of effective use with installations of the type described.

Although I have illustrated and described preferred embodiments of my invention, I do not wish to be limited thereby because the scope of my invention is best defined in the following claims.

I claim:

1. A spring fastener having a base, a pair of projections extending from said base in angular relation to the plane thereof, said projections being disposed in adjacent relation in the same plane and constructed and arranged to abut throughout their entire lengths, and holding elements integrally joined to the ends of said projections opposite said base, said elements extending toward said base in a generally reverse direction to that of said projections.

2. A spring fastener made from a single piece of wire and having a base, a pair of projections extending from said base in angular relation thereto, said projections being disposed in substantially parallel relation one to another along their entire lengths, each of said projections having a holding element integrally joined thereto at its outer end, said holding elements extending in a generally reverse direction relative to that of said projections, said elements being movable toward and away from each other in the same plane and including diverging and converging socket-engaging portions.

THOMAS W. HOSKING.

REFERENCES CITED

The following references are of record in the file of this patent:

UNITED STATES PATENTS

| Number | Name | Date |
|---|---|---|
| 1,992,093 | Place | Feb. 19, 1935 |
| 2,136,981 | Place | Nov. 15, 1938 |
| 2,221,009 | Van Uum | Nov. 12, 1940 |
| 2,389,635 | Place | Nov. 27, 1945 |